E. H. Crane,
Jaw Trap,
N° 25,179. Patented Aug. 23, 1859.
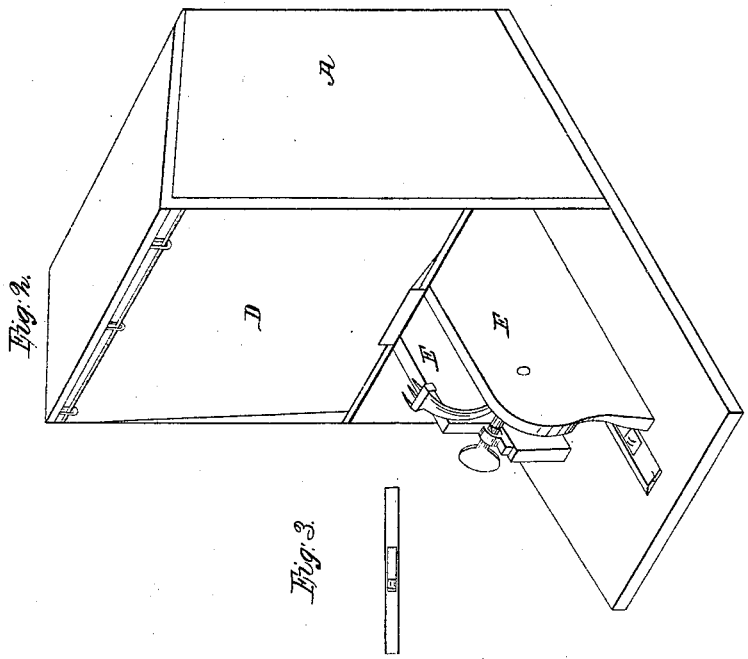
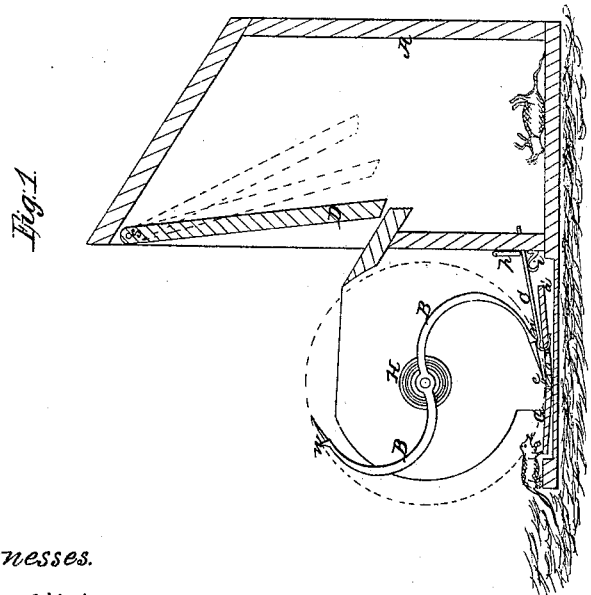
Witnesses.
Inventor.

UNITED STATES PATENT OFFICE.

ELLIOTT H. CRANE, OF BURR OAK, MICHIGAN.

RAT-TRAP.

Specification of Letters Patent No. 25,179, dated August 23, 1859.

*To all whom it may concern:*

Be it known that I, ELLIOTT H. CRANE, of Burr Oak, county of St. Joseph, and State of Michigan, have invented certain new and useful Improvements in Animal-Traps; and I do hereby declare that the following is a full, clear, and exact description thereof, reference being had to the accompanying drawings and to the letters of reference marked thereon.

The nature of my invention consists in combining and arranging the several parts of my machine in the manner hereinafter described.

In the drawings Figure 1 represents a vertical section; Fig. 2 a perspective view and Fig. 3 a top view of the platform on which the animal steps to the bait.

In the figures A represents a box trap which may be made in any of the known ways and forms.

D, represents the door of the trap, said door being hinged at its upper end at $s$, near the top of the box, as is seen, so that it hangs and swings backward and forward when required.

E, E, represent two rings which extend out in front of the box and in which wings a shaft I, has its bearings.

I, is a shaft which is provided with two arms B, B, which are curved and provided with three or more sharp prongs on their outer ends.

H, represents a spring which is coiled or wound around the shaft I and serves to give motion to the shaft when necessary.

$i$, represents a small spring which is secured to the side of the box and which supports a spring marked C—said spring C, being secured at one end to the box just above spring $i$. To the other end of C, is secured a curved strap $x$. This strap curves around passing through a slot $o$ in the platform $a$, and supports said platform. At that point where the strap $x$, connects with the spring C, a small notch is cut, into which notch a small projection $n$, on the ends of the arms B, B, catches and stations said arms.

$a$, represents a platform hinged at one end at $a'$, the other end swinging clear of the bottom of the box, said platform being supported as represented by the curved strap $x$.

$e$, represents the post on which the bait is placed, said post passing through the slot $o$, in the platform $a$.

This trap is used as follows: The bait is placed on and secured by two small hooks to the post $e$, the shaft I, is turned around until the spring is wound up, the spring $i$, pressing spring C, with its notch, against the arm B, the projection $n$, catches in said notch and stations said arm. The animal seeing the bait attempts to reach it, but stepping on the front of the platform its weight bears said platform down, releases the projection from the notch, which frees the arm B, and the spring H, acting on the shaft I, throws the said arm quickly around, the points strike the animal, kill him and throw him through door D into the box. Pressure being removed from the platform the arm comes around and catches automatically again and the trap is again set. Check $p$ regulates the pressure of spring C against the arm B.

Having thus fully described my invention what I claim as new and desire to secure by Letters Patent is—

The arrangement of platform $a$, spring C, strap $x$, spring $i$, and chuck $p$, with arms B, B, provided with projections $n$, $n$, spring H, and box A, provided with hanging door D, when the several parts are combined and operated substantially as and for the purpose specified.

ELLIOTT H. CRANE.

Witnesses:
HIRAM S. TYLER,
CHARLOTTE TYLER.